United States Patent Office 2,872,218
Patented Feb. 3, 1959

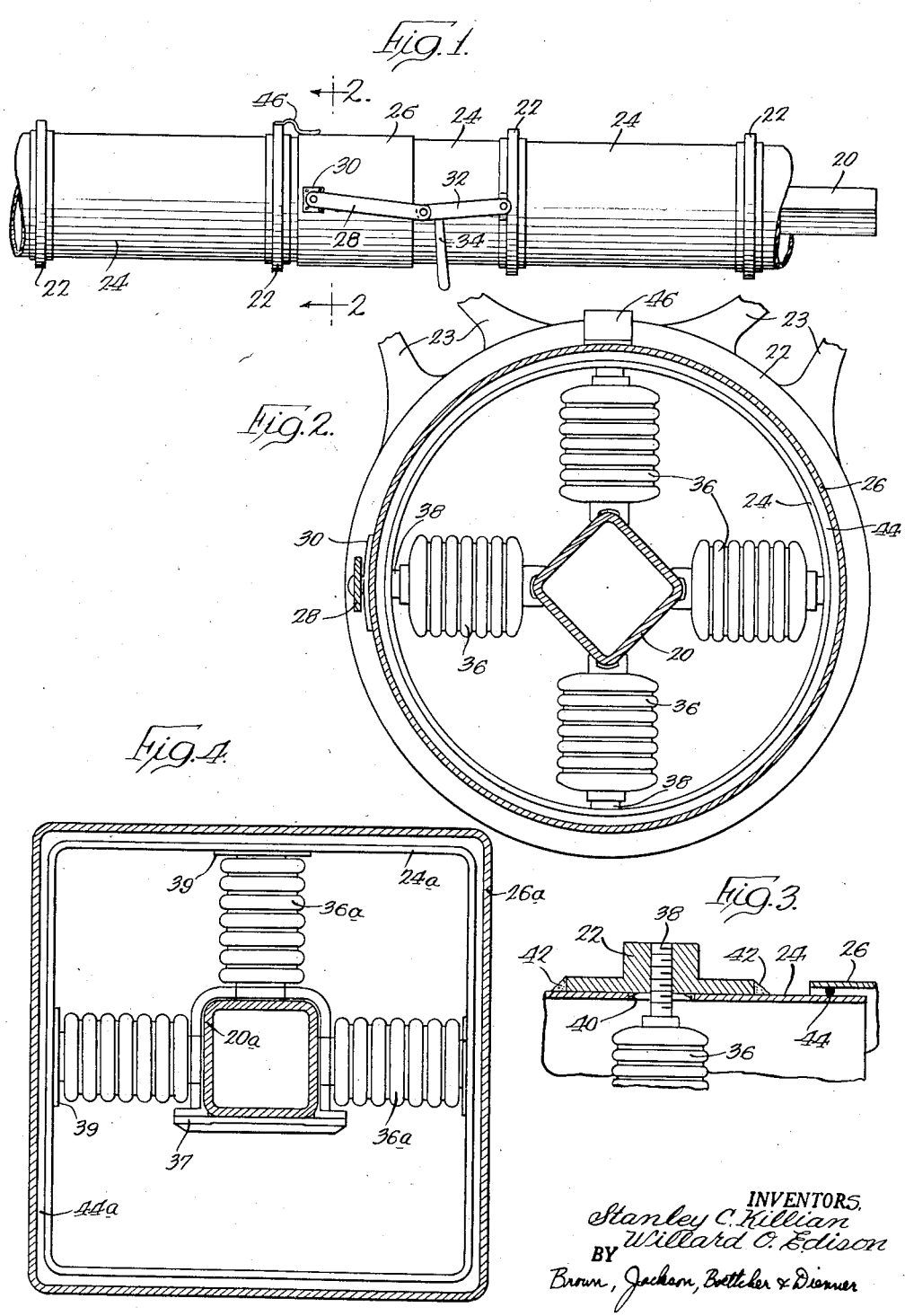

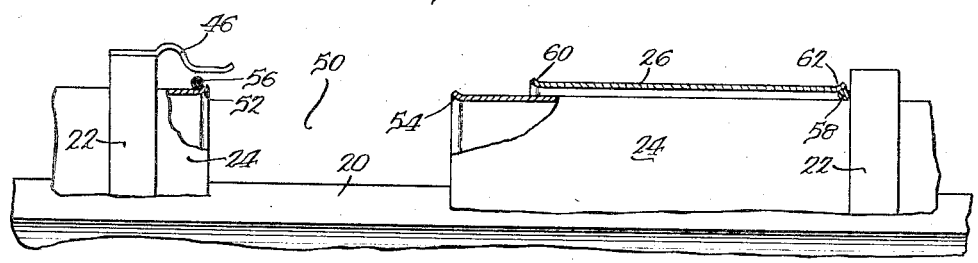
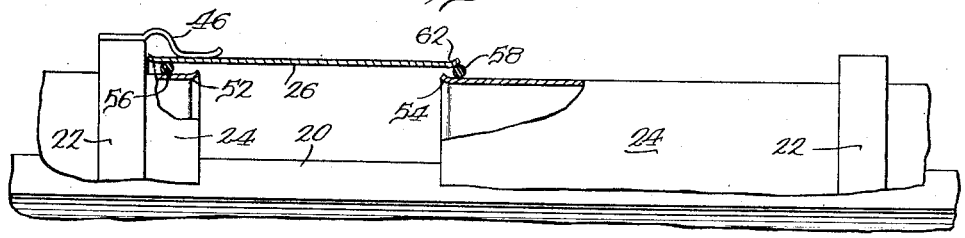
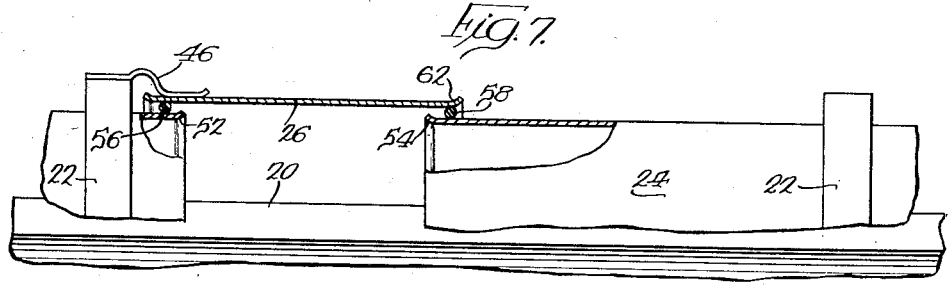

2,872,218

METHOD OF OPERATING INSPECTION SECTIONS IN BUS ENCLOSURES

Stanley C. Killian, Glen Ellyn, Ill., and Willard O. Edison, Denver, Colo., assignors to H. K. Porter Company (Delaware), a corporation of Delaware Original application May 7, 1952, Serial No. 286,645, now Patent No. 2,784,012, dated March 5, 1957. Divided and this application August 3, 1956, Serial No. 602,051

2 Claims. (Cl. 285—369)

The present invention relates to enclosures for bus bars, to telescopic inspection sections for bus enclosures and, particularly, to an improved method of operating such sections for affording ready access to the bus.

This application is a division of our copending application, Serial No. 286,645, filed May 7, 1952.

Bus bars for electrical power transmission are customarily enclosed in suitable housing means to protect the bus from the accumulation of foreign particles, to prevent the entry of moisture, to shield the bus from the elements and to protect personnel from accidentally contacting the same. Heretofore, the assembly of the bus covers or enclosures has been complex and inconvenient since two factors must be met. The first of these factors is that the covers must be sealed about the busses and the second is that the covers must be removable to provide for inspection and cleaning of the busses.

In view of these factors, conventional bus bar covers have been made in sections adapted to be detachably secured together and have included cumbersome seals and clamps to effect a detachable connection or assembly. For example, one conventional cylindrical bus cover, at each section of cover, comprises a pair of bus rings adapted to provide an insulated support for the bus bar and a mounting for the complete bus, a pair of semi-cylindrical cover sections adapted to be mated to provide a cylindrical cover for the bus, a pair of sectional gaskets, and suitable clamping means for each end of the cover sections. Since the cover has to seal the bus against entry of dust and moisture, the gaskets are quite voluminous and require a great number of fasteners or bolts. In addition, the joining of the gasket is very difficult to accomplish. Bus enclosures of the type described and other conventional enclosures present a major problem in inspection since considerable time and energy is involved in removing the various bolts, gaskets and cover sections to view the bus.

It is an object of the present invention to overcome the disadvantages of conventional busses by providing improved closure means therefor, and particularly, by providing an improved method of operating a telescopic enclosure assembly to render telescopic sections commercially practical in the bus enclosure art.

According to the present invention, we provide a bus enclosure comprising a pair of longitudinally spaced tubular stationary cover sections, a movable tubular cover section slidably or telescopically mounted on the stationary sections to bridge the space therebetween and enclose the bus, and gasket means between the movable and stationary sections adapted to accommodate movement of the telescopic section and to seal the sections when the telescopic section closes the space between the stationary sections.

Telescopic pipe joints of a structural assembly comparable to that above defined have been known in arts other than the bus enclosure art, particularly arts wherein the diameter of the pipe is small and the telescopic member, once assembled, is rarely if ever touched. In the known pipe joints, the gaskets or sealing means were so arranged, and the joint so used, that the telescopic member was moved against the frictional resistance of the seals. In small diameters, and where opening of the joint was rarely necessary, this may have been feasible, but in large sizes, such as required for enclosing a bus or the like, the area of the seals and the resistance to movement would be so great as to render application of known joints to large diameter installations totally impractical. This disadvantage would be further emphasized in the bus enclosure art, where the diameter of the enclosure is necessarily large, by the fact that the telescopic member or enclosure section must be opened at frequent intervals to accommodate inspection and repair of the bus.

To overcome the stated disadvantage of the previously known joints, the present invention provides a large diameter bus enclosure including a telescopically mounted section, and an improved method of operating that section whereby the seals or gaskets are engaged with the telescopic section during no more than a very limited portion of the movement of the telescopic section and are then freed from the telescopic section for movement independently thereof, whereby the telescopic section may be moved from at least substantially its fully closed position to its open position and back substantially to its closed position independently of and without frictional resistance from the seals, whereby the telescopic section may readily and freely be moved at frequent intervals to facilitate inspection and repair of the bus, and whereby telescopic inspection sections for bus enclosures are rendered commercially practical.

More particularly, it is an object of the present invention to provide an improved method of operating an open ended bus enclosure section which is telescopically mounted adjacent its opposite ends on a pair of spaced stationary sections and which is normally sealed to said stationary sections by an O-ring seal at each end thereof, comprising the steps of moving the telescopic section in one direction longitudinally of the bus enclosure to an extent sufficient to roll the seal at the trailing end thereof out of the said trailing end of the telescopic section, telescopically moving said seal in the opposite direction along the stationary section on which it is mounted, moving the telescopic section in the said oposite direction to roll the other seal out of the other end thereof, continuing to move the telescopic section, free of said seals, in said opposite direction to telescope the same freely onto the stationary section on which said first-mentioned seal is mounted, thus to open and space between said stationary sections, returning said telescopic section in said one direction, free of said seals, into engagement with said second-mentioned seal, further moving said telescopic section in said one direction a predetermined distance to roll said second-mentioned seal under the leading end of said telescopic section to a predetermined extent, moving said first-mentioned seal in said one direction into engagement with the adjacent end of said telescopic section, and moving said telescopic section in said opposite direction by a distance equal approximately to one-half said predetermined distance to roll said first-mentioned seal back under the adjacent end of said telescopic section, whereby said section and said seals are returned to their original positions and the enclosure is sealed about the bus.

By virtue of the defined method, the present invention affords the advantages of facilitating quick and convenient inspection of the bus without necessity for disassembly of each cover part or exertion of excessive force on the enclosure, thus greatly speeding up and rendering much more efficient bus inspection.

Other objects and advantages of the present invention will become apparent in the following detailed description of preferred embodiments of the invention, wherein reference is made to the accompanying drawings, in which:

Figure 1 is a side elevation of a bus and an enclosure therefor, the closure being shown as circular in cross-section, but which may be of any desired cross-sectional configuration;

Figure 2 is a cross-sectional view of a bus and a cylindrical cover therefor, the view being taken substantially on line 2—2 of Figure 1;

Figure 3 is a partial longitudinal section of the bus shown in Figure 2, the view being taken at a bus ring and showing a movable cover section sealed to a stationary cover section;

Figure 4 is a view similar to Figure 2 of a bus having a square tube cover; and

Figures 5 to 7 are partial side views, partly in section and partly in elevation, of the bus enclosure of the invention showing the movable section in open, partially closed and closed positions, respectively, thus to teach the method of the invention.

Referring now to the drawings, we have shown a bus comprising a continuous bus bar 20 supported by means of insulators 36 at spaced points by means of a plurality of bus rings 22 which are each adapted to be secured by their flanges 23 (see Figure 2) to suitable supporting means (not shown). The bus rings 22 also provide a support for a bus cover comprising a plurality of stationary sections 24 and a movable section 26. As will be apparent, the movable section 26 is telescopically mounted for movement on one of the stationary sections 24 of the cover. If desired, a movable section 26 may be provided between each pair of bus rings, between every other pair of bus rings, or whatever arrangement may be required or desired for particular installations. As will become more fully apparent hereinafter, the movable section 26 is sealed with respect to the stationary cover sections 24 by means of a pair of gaskets disposed adjacent the opposite ends thereof. The gaskets will be described at greater length hereinafter.

To effect telescopic movement of the section 26 along the stationary cover sections 24, the movable section 26 may be provided with suitable actuating means in the form of a linkage assembly. As shown in Figure 1, the movable cover 26 is provided with a toggle linkage including a link 28 pivoted to the movable section 26 by means of a bracket 30, a second link 32 pivoted at its opposite ends to the link 28 and to one of the bus rings 22, respectively, and a handle 34 secured to or formed integrally with the link 32. Actuation of the movable cover 26 by means of the handle 34 will be obvious. The linkage preferably is insulatingly mounted at least adjacent one end so as to provide no conducting path from the movable cover 26 to the fixed cover 24, or the ring 22 at the right. If preferred, a portable linkage, or actuator, may be employed and shifted from one movable cover 26 to another. For example, the sliding section can be moved very easily by clamping straps about the sliding section. The straps can have holes to take bars which fasten to toggle levers with the toggle levers being fastened to a base ring.

Referring now to Figures 2 and 3, the bus bar 20 is shown as being square in cross-section and supported at each corner thereof by means of an insulator 36. Each insulator 36 is adjustably confined between the bus ring 22 and the bus bar 20 by means of an adjusting screw 38 threaded into a tapped bore provided in the bus ring 22. In the preferred structure, the cover sections 24 and 26 are peripherally continuous cylindrical sections and the stationary sections 24 are passed through the interior of the bus rings 22 so as to eliminate any possibility of breathing or leakage due to faulty ring castings. To accommodate passage of the adjusting screw 38, the stationary cover sections 24 are provided with holes therein at the ring portion thereof. To prevent leakage, the cover sections 24 are preferably welded about the holes provided therein, as indicated at 40, to provide a seal between the cover and the bus rings 22. At the exterior surface thereof, the cover sections 24 are preferably welded to the bus rings 22, as indicated at 42, to either side of the bus rings.

To provide a seal between the movable cover section 26 and the stationary cover sections 24, suitable gaskets 44 are provided between the cover sections 24 and 26. The gaskets 44 suitably insulate the movable cover section 26 from the stationary cover section 24, to its right, for example, and prevent circulating currents from running the length of the bus enclosure. It is preferable to ground the bus rings 22 so that the stationary covers sections 24, which are welded to the bus rings 22, are also grounded. To ground the movable cover sections 26, a suitable lamination, indicated at 46, is provided between each of the cover sections 26 and the bus ring 22 to its left. In the preferred embodiment, the laminations 46 are preferably secured to the bus rings 22 and may be detachably secured to the movable cover sections 26. However, as shown in the drawings, the laminations 46 may be in the nature of a spring finger adapted frictionally to engage the cover section 26 when the same is moved into position to close the opening provided in the stationary cover sections 24. If desired, a plurality of laminations 46 may be provided for each movable cover section 26.

Referring now to Figure 4, we have shown a square bus cover adapted to employ the features of the present invention. The embodiment of the invention shown in Figure 4 is very similar to the embodiment of the invention previously described and, for this reason, parts and elements of the embodiment of the invention in Figure 4 similar to parts and elements of the embodiment of the invention shown in Figures 1 to 3 have been indicated by like reference numerals with the suffix "a." As shown in Figure 4, the bus bar 20a is square in section and is supported within the square cover by means of a plurality of insulators 36a and a square bracket 37 supported by the insulators and encompassing the bus bar 20a. In the embodiment of the invention shown in Figure 4, the bus rings 22 are omitted since the stationary cover sections 24a may be suitably secured directly to a supporting structure. The movable cover section of the bus enclosure is indicated at 26a and may be suitably provided with toggle linkage means similar to those shown in Figure 1 for actuating the same, although such means are not shown in Figure 4. The insulators 36a each preferably include a flat plate 39 at the outer end thereof by means of which the insulator is secured to the stationary cover section 24a, as by riveting or welding. To seal the movable cover section 26a with respect to the stationary cover sections 24a, a suitable gasket 44a is provided between the two sections. As pointed out hereinbefore, to eliminate the possibility of circulating currents running the length of the bus, the movable cover section 26a may be suitably grounded by means of a lamination or the like, not shown.

While we have only shown herein circular and square type bus covers, it will be appreciated as the description proceeds that the present invention is not limited in application to the two types of bus covers shown, but may be applied to covers having various configurations.

Referring now to Figures 5, 6, and 7, we have shown, somewhat schematically, one embodiment of the movable cover section and sealing means therefor according to the present invention. As shown in Figure 5, the stationary cover portions 24 are provided in separate sections with the section shown at the left of the figure terminating adjacent one of the bus rings and the section shown at the right of the figure terminating in spaced relation to the first stationary section so that an opening or interruption 50 is provided in the cover between the stationary sections thereof. It will be appreciated that while we prefer to provide a complete interruption between the stationary cover sections 24, the stationary cover may be continuous and provided at spaced points therein with openings in the nature of windows or the like to facilitate the observation and inspection of the bus bar within the cover. As pointed out, it is preferred that a complete interruption be provided between the stationary cover sections so that the cover provided by the present invention may be made up and assembled in sections for convenience in handling the same.

At the free ends thereof defining the interruption between the stationary cover sections, each cover section is preferably turned outwardly to a slight extent so as to provide an outwardly extending lip or the like, as indicated at 52 and 54, respectively. As will be appreciated, the lips 52 and 54 may be continuous or interrupted, as desired. Each of the stationary cover sections 24 is adapted for the reception of and carries a gasket, indicated at 56 and 58, respectively. The gasket 56 is adapted to be received on the portion of the stationary cover section shown at the left of the figures so as to be confined between the bus ring 22 and the lip 52 provided on the stationary cover section 24. The gasket 58 is adapted to be received and carried by the stationary cover section 24 shown at the right in the figures and is adapted to be confined on the cover section between the lip 54 and the bus ring 22 supporting that cover section.

The gaskets 56 and 58 preferably comprise conventional O-ring seals formed of a resilient sealing material, such as neoprene, rubber, or the like. By providing O-ring seals between the stationary and movable cover sections, the present invention provides for rolling movement of the seals along the cover sections so as to appreciably reduce the frictional engagement between the seals and the cover sections and thus to substantially reduce the amount of energy required to effect the seal and to effect movement of the movable cover section. While the O-ring seals have application to bus bar covers of substantially all configurations, it will be appreciated that the merits thereof are more greatly enjoyed with bus bars having a circular cross-section since the rolling action described hereinbefore is most radially accomplished on a cylindrical surface.

At the opposite ends thereof, the movable cover section 26 is provided with outwardly turned portions to provide lips 60 and 62, respectively, under which the seals or gaskets 56 and 58 may be rolled.

Referring to Figure 5, the movable cover section 26 is shown in its open position wherein the bus bar is exposed for inspection, cleaning and repair through the interruption 50 provided between the stationary cover sections 24. To close the interruption or opening between the stationary cover sections, the present invention provides an improved method for operating or moving the movable section 26 and the seals 56 and 58, wherein the sequence of movement is as follows: The movable cover section 26 is moved to the left, for example by the toggle arrangements described above in connection with Figure 1, to cause the lip 60 provided on the left hand end of the movable cover section 26 to engage the O-ring seal 56. Upon engagement of the lip 60 with the seal 56, the O-ring 56 is rolled along the surface of the stationary cover section 24 and underneath the lip 60 so as to be confined between the cover sections 26 and 24, as is shown in Figure 6. Thereafter, the gasket 58 provided on the other stationary housing section 24 is rolled, as by hand, along the section from the position shown in Figure 5 to the position in Figure 6 wherein the same engages the lip 62 provided at the right hand end of the movable cover section 26. After the O-ring 58 has been engaged with the lip 62, the movable cover section 26 may be moved to the right to roll the O-ring 58 under the lip 62 and to confine the same between the cover sections 26 and 24, as is shown in Figure 7.

To effect the defined action of the movable cover section 26 and the O-ring seals 56 and 58, the cover section 26 is moved to the left after engagement with the O-ring 56 by a predetermined distance or extent so as to effect a predetermined rolling movement of the seal 56. After the O-ring 58 has been engaged with the opposite end of the movable cover section 26, the section 26 is returned or moved to the right by a distance equal to half the hereinbefore stated predetermined distance of movement so as to confine both of the seals 56 and 58 between the cover section 26 and the cover sections 24. The seals 56 and 58, due to their frictional engagement with the cover sections and due to their resistance to rolling action along the cover sections 24, will be suitably confined between the movable cover section and the stationary cover sections in the manner described. It is preferred that the seals 56 and 58 be slightly compressed upon confinement between the cover sections so as to be disposed in intimate sealing engagement with the cover sections when the interruption or opening in the stationary cover sections is closed by the movable cover section 26. Accordingly, the seals 56 and 58 frictionally hold the cover section against accidental relative movement with respect to the stationary sections 24 and provide an efficient seal between the cover sections to prevent the entry of dirt, dust and moisture to the interior of the cover. Therefore, the bus bar enclosed by the cover will be effectively sealed from atmosphere by the enclosure of the present invention. It will also be observed that gasket 58 electrically insulates cover 26 from cover section 24 to its right. This prevents circulating currents from running the full length of the bus enclosure. In addition, the sealed joints defined by the enclosure means described accommodate expansion and contraction of the enclosure sections due to thermal variations, accommodate large assembly tolerances in the longitudinal direction and dampen vibrations which may be transmitted to the enclosure from the generator island of the system.

According to the method of the invention, the enclosure is opened to provide for inspection of the bus generally by the same movements as described above in reverse sequence. Specifically, it is merely necessary to move the movable cover section 26 to the left by one-half the said predetermined distance so as to release the cover section from the seal 58. The O-ring 58 is then rolled along the cover section 24 shown at the right of the figures toward the right hand bus ring 22. Thereafter, the movable cover section 26 may be readily returned to the right to the position shown in Figure 5 wherein the opening 50 is exposed to provide for inspection and cleaning of bus.

From the foregoing, it is to be appreciated that the method of the present invention resides in a series or sequence of independent manual movements of the telescopically movable section 26 and the O-ring seal 58 in such manner that the seals 56 and 58 are engaged with the section 26 during no more than a very limited portion of the movement of the telescopic section, whereby the telescopic section may be telescoped freely and without frictional resistance, independently of the seals, onto and off of the right hand stationary section 24. By virtue of this method, telescopic, sealed inspection sections for bus enclosures, despite their large diameter and frequency of actuation, are rendered commercially practical. The telescopic sections in turn afford the marked advantage that the enclosure can be opened, the bus inspected, and the enclosure resealed in an exceedingly short period of time.

While we have described what we regard to be preferred embodiments of our invention, it will be apparent that various changes, rearrangements and modifications

We claim:

1. The method of operating an open ended bus enclosure section which is telescopically mounted adjacent its opposite ends on a pair of spaced stationary enclosure sections and which is normally sealed to said stationary sections by a seal at each end thereof surrounding the respective stationary section, comprising the steps of moving the seal at one end of said telescopic section longitudinally of the one stationary section on which said seal is mounted in the direction away from said telescopic section a distance equal approximately to the length of said telescopic section, subsequently moving said telescopic section in said direction a distance equal approximately to the length of said telescopic section to free the same from the other seal and to telescope the entirety of said telescopic section independently of said seals onto said one stationary section, thus to open fully the space between said stationary sections, returning said telescopic section an equal distance in the opposite direction independently of said seals into engagement with said other seal, and moving said first-mentioned seal an equal distance in said opposite direction into engagement with the adjacent end of said telescopic section, thus to close the ends of said telescopic section and to seal the same to said stationary sections.

2. The method of operating an open ended bus enclosure section which is telescopically mounted adjacent its opposite ends on a pair of spaced stationary enclosure sections and which is normally sealed to said stationary sections by an O-ring seal closely adjacent each end thereof encircling the respective stationary section, comprising the steps of moving the telescopic section in one direction longitudinally of the bus enclosure a distance comprising a very limited portion of the movement of said telescopic section sufficient to roll the seal out of the trailing end of the telescopic section; telescopically moving said seal in the opposite direction along the stationary section on which it is mounted a distance equal approximately to the length of said telescopic section; moving the telescopic section in the said opposite direction a distance equal approximately to twice said first mentioned distance and sufficient to roll the other seal out of the other end thereof; continuing to move the telescopic section, free of said seals, in said opposite direction to telescope the same substantially in its entirety freely onto the stationary section on which said first-mentioned seal is mounted, thus to fully open the space between the stationary sections; returning said telescopic section in said one direction, free of said seals, into engagement with said second-mentioned seal; further moving said telescopic section in said one direction a distance equal approximately to twice said first-mentioned distance to roll said second-mentioned seal under the leading end of said telescopic section; moving said first-mentioned seal in said one direction into engagement with the adjacent end of said telescopic section; and moving said telescopic section in said opposite direction a distance equal substantially to said first mentioned distance to roll said first-mentioned seal back under the adjacent end of said telescopic section, whereby said section and said seals are returned to their original positions and the enclosure is sealed about the bus.

References Cited in the file of this patent

UNITED STATES PATENTS 2,532,773    Kellam    Dec. 5, 1950

FOREIGN PATENTS 545,933    France    Aug. 4, 1922